United States Patent
Wu et al.

(10) Patent No.: US 12,366,155 B2
(45) Date of Patent: Jul. 22, 2025

(54) MUD PULSE GENERATION SYSTEM BASED ON TWO-WAY COMMUNICATION

(71) Applicants: CHINA PETROLEUM & CHEMICAL CORPORATION, Beijing (CN); SINOPEC PETROLEUM ENGINEERING TECHNOLOGY SERVICE CO., LTD, Beijing (CN); SINOPEC MATRIX CORPORATION, Shandong (CN); GEOSTEERING & LOGGING RESEARCH INSTITUTE, SINOPEC MATRIX CORPORATION, Shandong (CN)

(72) Inventors: Baizhi Wu, Shandong (CN); Wei Chen, Shandong (CN); Qingming Ma, Shandong (CN); Ningning Yang, Shandong (CN); Shugang Hou, Shandong (CN); Hongbing Xiao, Shandong (CN); Shan Li, Shandong (CN); Qinglong Liu, Shandong (CN); Wenting Liu, Shandong (CN)

(73) Assignees: CHINA PETROLEUM & CHEMICAL CORPORATION, Beijing (CN); SINOPEC PETROLEUM ENGINEERING TECHNOLOGY SERVICE CO., LTD, Beijing (CN); SINOPEC MATRIX CORPORATION, Shandong (CN); GEOSTEERING & LOGGING RESEARCH INSTITUTE, SINOPEC MATRIX CORPORATION, Shandong (CN)

( * ) Notice: Subject to any disclaimer, the term of this patent is extended or adjusted under 35 U.S.C. 154(b) by 0 days.

(21) Appl. No.: 18/691,563

(22) PCT Filed: Sep. 28, 2022

(86) PCT No.: PCT/CN2022/122145
§ 371 (c)(1),
(2) Date: Mar. 13, 2024

(87) PCT Pub. No.: WO2023/051610
PCT Pub. Date: Apr. 6, 2023

(65) Prior Publication Data
US 2025/0129703 A1    Apr. 24, 2025

(30) Foreign Application Priority Data

Sep. 30, 2021  (CN) .......................... 202111158736.8

(51) Int. Cl.
*E21B 47/20*   (2012.01)
*E21B 44/04*   (2006.01)
(Continued)

(52) U.S. Cl.
CPC .............. *E21B 44/04* (2013.01); *E21B 47/18* (2013.01); *H04L 67/125* (2013.01)

(58) Field of Classification Search
CPC ............................ E21B 41/0085; E21B 47/20
See application file for complete search history.

(56) References Cited

U.S. PATENT DOCUMENTS

| | | |
|---|---|---|
| 5,517,464 A | 5/1996 | Lerner et al. |
| 5,787,052 A | 7/1998 | Gardner et al. |

(Continued)

FOREIGN PATENT DOCUMENTS

| | | |
|---|---|---|
| CN | 1721655 A | 1/2006 |
| CN | 103827695 A | 5/2014 |

(Continued)

OTHER PUBLICATIONS

CN-104680766-A English Language Translation (Year: 2015).*
CN-205154151-U English Language Translation (Year: 2016).*
CN-208184724-U English Language Translation (Year: 2018).*

*Primary Examiner* — Curtis A Kuntz
*Assistant Examiner* — Jerold B Murphy
(74) *Attorney, Agent, or Firm* — NKL Law; Allen Xue (57) ABSTRACT

A mud pulse generation system based on two-way communication includes a turbine stator having at least two stator openings (35) each with a preset opening angle; a turbine rotor, having a sidewall provided with at least one wide blade and at least one narrow blade spaced from each other through several openings; a power generation module driven by rotation of the turbine rotor for supplying power; and a master device configured to control relative time when the wide blade or the narrow blade passes through the stator openings by controlling a controllable load of the power generation module based on uplink information, generate an uplink pulse signal with variable time intervals at the stator openings, and monitor and decode three-phase AC voltage (Continued)

signal output by the power generation module to obtain downlink information. This system is able to generate high-frequency pressure fluctuation pulse without requiring external power supply.

12 Claims, 6 Drawing Sheets (51) Int. Cl.
*E21B 47/18* (2012.01)
*H04L 67/125* (2022.01)

(56) References Cited

U.S. PATENT DOCUMENTS

| | | | |
|---|---|---|---|
| 10,113,420 B2 * | 10/2018 | Pogrebinsky | E21B 47/18 |
| 11,888,375 B2 * | 1/2024 | Yang | H02K 3/38 |
| 2004/0156265 A1 | 8/2004 | Lavrut et al. | |
| 2009/0285054 A1 | 11/2009 | Song | |
| 2010/0185394 A1 | 7/2010 | Wu et al. | |
| 2017/0130578 A1 | 5/2017 | Skerry | |
| 2020/0109974 A1 * | 4/2020 | Hill, III | G01N 11/08 |
| 2024/0337180 A1 * | 10/2024 | Neate | E21B 44/00 |
| 2025/0020033 A1 * | 1/2025 | Sauthoff | E21B 34/066 |

FOREIGN PATENT DOCUMENTS

| | | | |
|---|---|---|---|
| CN | 104680766 A | * | 6/2015 |
| CN | 105422029 A | | 3/2016 |
| CN | 205154151 U | * | 4/2016 |
| CN | 208184724 U | * | 12/2018 |
| EP | 0140788 A2 | | 5/1985 |

* cited by examiner

MUD PULSE GENERATION SYSTEM BASED ON TWO-WAY COMMUNICATION

TECHNICAL FIELD

The present invention relates to the technical field of measurement-while-drilling in petroleum drilling engineering, and specifically to a mud pulse generation system based on two-way communication.

TECHNICAL BACKGROUND

With the advancement of drilling technology, such as measurement-while-drilling and geosteering, more and more downhole parameters are measured during measurement-while-drilling with increasingly higher requirements for real-time measurement. The application of switching-valve negative pulse and positive pulse is limited due to low transmission rate which can't meet the requirement for transmitting a large number of geologic parameters. However, continuous-wave pulse transmission method with high transmission rate and strong interference resistance may become the most widely used data transmission method with great potential for development.

The existing continuous-wave mud pulse signal generator is divided into two types, namely the rotary-valve generator and the shear-valve generator, which mainly work as follows. The stator is installed above or below the rotor which rotates under the action of the motor alone, or the motor and mud together. Periodic changes are formed in flow area of the stator and the rotor, thereby generating continuous positive pressure pulses inside the string. The pulses are encoded by the control system, so that the rotor is driven to rotate to form a series of periodic positive-pressure pulse signals, which are then transmitted to the ground receiving device at a fast speed up to 5-40 bit. Despite the advantage of small power consumption, the conventional switching-valve pulser needs to be powered by batteries. Moreover, since the rotor is driven to overcome hydraulic force and friction torque for high-speed rotation or shear oscillation, the continuous-wave pulser with high speed rate requires large power, and is usually equipped with a dedicated mud generator for power supply.

SUMMARY OF THE INVENTION

In view of the above technical problems, the present invention proposes a mud pulse generation system based on two-way communication, which comprises a turbine stator, comprising at least two stator openings each with a preset opening angle; a turbine rotor, having a sidewall provided with at least one wide blade and at least one narrow blade spaced from each other through several openings: a power generation module, which is driven by rotation of the turbine rotor for supplying power; and a master device, which is configured to control relative time when the wide blade or the narrow blade passes through the stator openings by controlling a controllable load of the power generation module based on uplink information, generate an uplink pulse signal with variable time intervals at the stator openings, and monitor and decode three-phase AC voltage signal output by the power generation module to obtain downlink information.

Preferably, the preset opening angle is configured to meet a stator opening condition, wherein a ratio of straight angle to the preset opening angle is an integer greater than or equal to 2.

Preferably, an axial height of the turbine stator is determined according to the following expression:

$$H1 \leq \frac{\pi D1 \tan B}{2},$$

wherein H1 denotes the axial height of the turbine stator, D1 denotes a maximum outer diameter of the turbine stator, and B denotes a helix angle of the turbine stator; and
an axial height of the turbine rotor is equal to that of the turbine stator.

Preferably, an angle corresponding to the wide blade is equal to the preset opening angle, or the angle corresponding to the wide blade is less than and close to the preset opening angle.

Preferably, an angle corresponding to the narrow blade is determined according to the following expression:

$$D2 \leq \frac{180 - E}{\frac{n}{2} + 1},$$

wherein D2 denotes the angle corresponding to the narrow blade, E denotes the angle corresponding to the wide blade, and n denotes a total number of the narrow blades of the turbine rotor when at least one narrow blade is provided within a semicircular area in a cross-section of the turbine rotor.

Preferably, the power generation module is configured as a low-rotation speed generator with multiple pole pairs, wherein a number of pole pairs of the power generation module is twice a ratio of a round angle to the preset opening angle.

Preferably, the master device comprises a pulse control module configured to select different time-interval coding strategies according to results of monitoring output voltages of the power generation module and current uplink information to be transmitted to the ground, in order to generate said uplink pulse signal.

Preferably, the pulse control module is configured to monitor continuous change in a waveform of each phase in the three-phase AC voltage signal output by the power generation module, and switch off the controllable load when the signal is detected to be in a first state, wherein a first-state waveform consists of a plurality of first waveforms with a full period of t1 and a second waveform with a full period of t2, the first waveform being generated when the narrow blade passes through the stator openings, and the second waveform and pulses in the uplink pulse signal being generated when the wide blade passes through the stator openings.

Preferably, the pulse control module is further configured to identify the uplink information obtained from a downhole measurement and control system, determine a time-interval coding strategy combination according to the uplink information, and generate the uplink pulse signal with variable time intervals at the turbine stator according to a mode of switching on and off the controllable load corresponding to each state element indicated in the time-interval coding strategy combination, thereby realizing transmission of the uplink information to the ground, wherein said time-interval coding strategy combination comprises different types of state elements arranged in a specified state sequence generated based on the uplink information, said state elements including a first state and different types of first-state altered states, each of the first-state altered states being a state of the three-phase AC voltage signal generated when the pulse control module replaces at least one first waveform in the first-state waveform with another waveform through switching on the controllable load.

Preferably, the master device further comprises a decoding module configured to monitor change in voltage amplitude of said three-phase AC voltage signal, decode, when the voltage signal is detected as containing downlink information, a current three-phase AC voltage signal to extract the downlink information, so that the downlink information is transmitted to the downhole measurement and control system.

Preferably, the master device further comprises: a rectifying module, connected to a three-phase AC output end of the power generation module, and configured to obtain and rectify the three-phase AC voltage signal output by the power generation module, in order to supply power to the controllable load of the power generation module; and a DC voltage conversion module, connected to an output end of the rectifying module, and configured to convert rectified output voltage signal into DC voltage, in order to generate power signals of different DC voltage levels, thereby supplying power to the downhole measurement and control system, as well as the decoding module and the pulse control module within the master device.

Preferably, the change in amplitude of the three-phase AC voltage signal is realized by controlling change in mud displacement.

Compared with the prior arts, one or more of the embodiments in the above technical solutions have the following advantages or advantageous effects.

The present invention proposes a mud pulse generation system based on two-way communication. The system adopts a low-rotation speed power generator module having multiple pole pairs, and is driven to generate power by a turbine stator with specific fan-shaped openings and a turbine rotor with straight blades of two cross-sectional shapes distributed evenly from each other. The generator-output signals are rectified by a control circuit, in order to supply power to external systems. In the meantime, the generator load is dynamically adjusted by switching on and off a controllable load. According to the mapping network between the uplink information and the specific coding time rule, a specific rule of change in generator load is formed, so that during one rotation of the turbine rotor, the rotor blades with two types of cross-sectional shapes pass through the turbine stator openings, generating mud signal of pressure pulses with variable intervals between adjacent valid pulses. Due to the generator load, the timing when valid pressure pulse appears corresponds to the specific coding rule, and finally the pressure pulse sequence that can be received and decoded on the ground can be formed. In addition, the rotation speed of the turbine rotor changes due to the displacement change under the control of the ground system, which results in change in generator voltage output. Specific displacement changes are generated as the ground device controls the displacement according to the preset rule. The control circuit detects the change in generator voltage, and decodes the data according to the set rule. The frequency of the pressure fluctuation pulse generated in the present invention is determined by the stator, the rotor, and the properties of power generation module in the present invention. Therefore, a pulse rate much higher than that of a conventional switching-valve pulser can be generated, which can be even close to or exceed that of a continuous-wave pulser. Moreover, the mud pulse generation system according to the present invention, while generating mud pulses, requires no external power supply, and can supply power to external systems.

Other features and advantages of the present invention will be set forth in the description which follows, and, in part, will be apparent from the description, or may be learned from the implementation of the present invention. The objective and other advantages of the present invention may be realized and attained from the structure particularly pointed out in the description, claims and drawings.

BRIEF DESCRIPTION OF THE DRAWINGS

The accompanying drawings are used to provide a further understanding on the present invention, and constitute a part of the description. Together with the embodiments of the present invention, the drawings are intended to explain the present invention, but do not constitute any limitation to the present invention. In the drawings.

DETAILED DESCRIPTION OF EMBODIMENTS

The implementation mode of the present invention will be explained in detail with reference to the embodiments and the accompanying drawings, whereby it can be fully understood how to solve the technical problem by the technical means according to the present invention, implement the technical solution, and achieve the technical effects thereof. It should be noted that all the embodiments and the technical features defined therein may be combined together if there is no conflict, and the technical solutions obtained in this manner shall all fall within the scope of protection of the present invention.

In addition, the steps illustrated in the flow chart in the drawings can be performed in a computer system containing a set of computer-executable instructions. Moreover, although a logical sequence is shown in the flow chart, in some cases these steps as shown or described may be performed in an order different than that shown herein.

With the advancement of drilling technology, such as measurement-while-drilling and geosteering, more and more downhole parameters are measured during measurement-while-drilling with increasingly higher requirements for real-time measurement. The application of switching-valve negative pulse and positive pulse is limited due to low transmission rate which can't meet the requirement for transmitting a large number of geologic parameters. However, continuous-wave pulse transmission method with high transmission rate and strong interference resistance may become the most widely used data transmission method with great potential for development.

The existing continuous-wave mud pulse signal generator is divided into two types, namely the rotary-valve generator and the shear-valve generator, which mainly work as follows. The stator is installed above or below the rotor which rotates under the action of the motor alone, or the motor and mud together. Periodic changes are formed in flow area of the stator and the rotor, thereby generating continuous positive pressure pulses inside the string. The pulses are encoded by the control system, so that the rotor is driven to rotate to form a series of periodic positive-pressure pulse signals, which are then transmitted to the ground receiving device at a fast speed up to 5-40 bit. Despite the advantage of small power consumption, the conventional switching-valve pulser needs to be powered by batteries. Moreover, since the rotor is driven to overcome hydraulic force and friction torque for high-speed rotation or shear oscillation, the continuous-wave pulser with high speed rate requires large power, and is usually equipped with a dedicated mud generator for power supply.

In order to improve the properties of the existing pulse generation system, the present invention proposes a mud pulse generation system based on two-way communication, which comprises a turbine stator comprising at least two stator openings each with a preset opening angle; a turbine rotor arranged below the turbine stator, wherein a sidewall of the turbine rotor is provided with at least one wide blade and at least one narrow blade by means of several openings spaced apart; a power generation module for generating power through continuous rotation of the turbine rotor, generating a mud displacement signal corresponding to a downlink pulse signal, and in the meantime, supplying power to a control device and a downhole measurement and control system; and a master device, which is configured to control relative positions where the wide blade or the narrow blade pass through the stator openings by controlling a controllable load of the power generation module based on information to be uploaded to the ground. Accordingly, an uplink pulse signal with variable time intervals is generated at the stator openings, and said mud displacement signal is obtained and decoded, so that the downhole measurement and control system obtains information transmitted from the ground to the downhole by decoding the downlink pulse signal.

In this manner, the mud pulse generation system according to the present invention is capable of generating mud pulses while supplying power to external systems without external power supply. Furthermore, a plurality of coding rules based on the change in the generator load can be formed by controlling the timing of the on/off state of the controllable load based on uplink information, and then the uplink pulse signal containing features of the uplink information can be transmitted to the ground through a coding rule combination corresponding to the uplink information, in order to form a sequence of pressure pulses that can be received and decoded by the ground.

Figure 1:
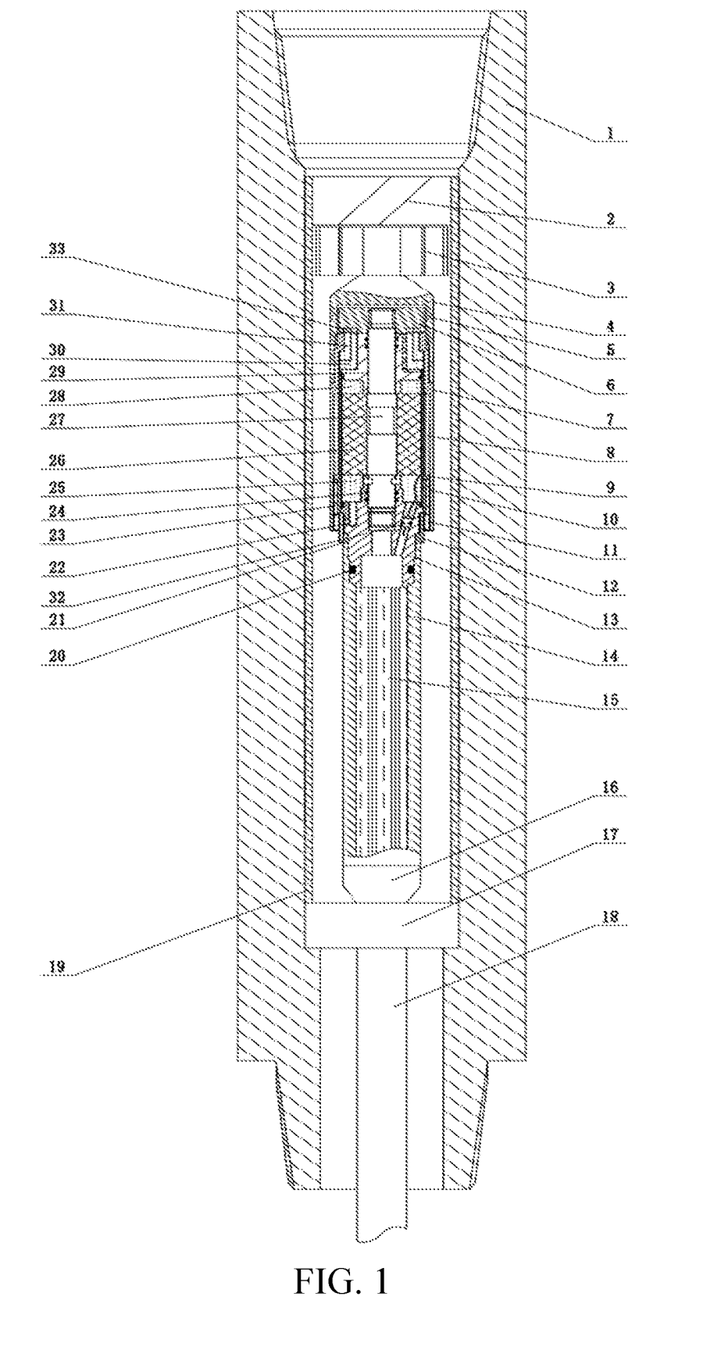
FIG. 1 schematically shows a mud pulse generation system based on two-way communication in use according to embodiments of the present application.
Figure 2:
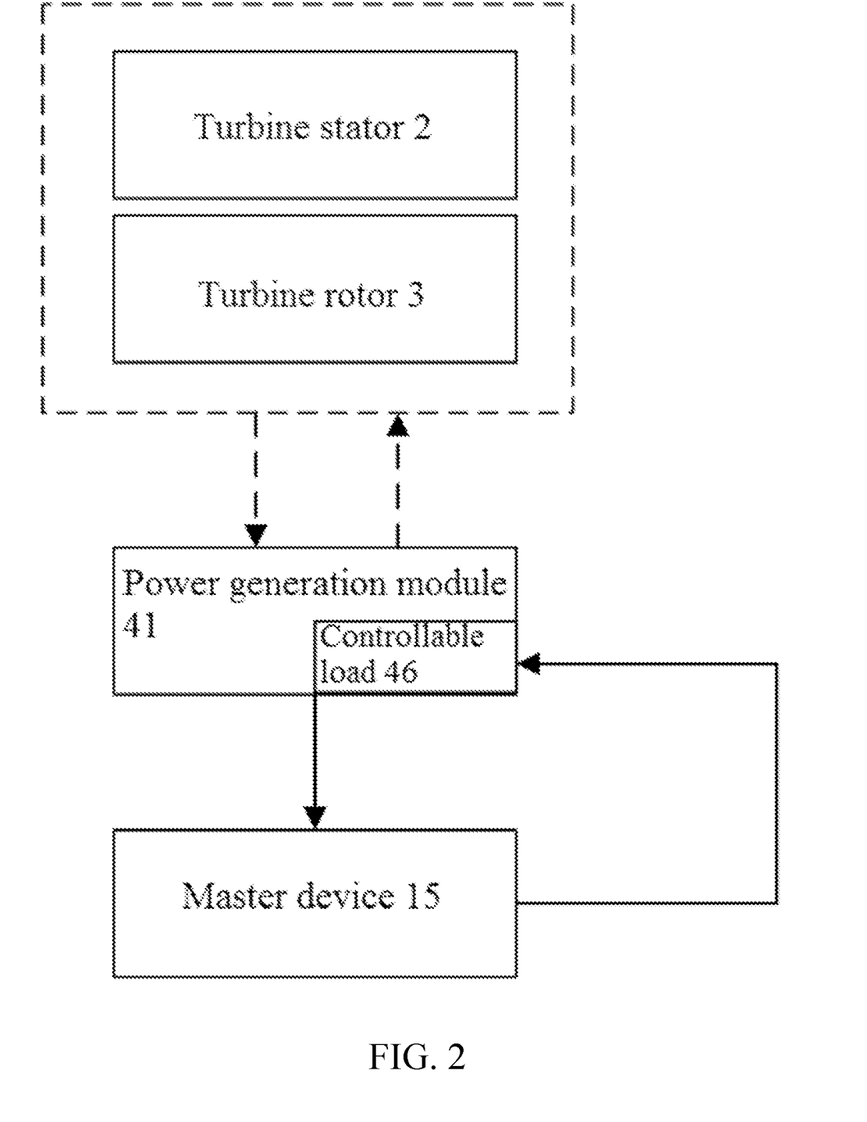
FIG. 2 schematically shows an overall structure of the mud pulse generation system based on two-way communication according to embodiments of the present application.

FIG. 1 schematically shows a mud pulse generation system based on two-way communication in use according to embodiments of the present application. FIG. 2 schematically shows an overall structure of the mud pulse generation system based on two-way communication according to embodiments of the present application. As shown in FIG. 2, the mud pulse generation system according to the present invention comprises a turbine stator 2, a turbine rotor 3, a power generation module 41 and a master device 15, wherein the power generation module 41 comprises a power-generation-module rotor 7, a power-generation-module stator 26 and other ancillary members, and the power generation module 41 is capable of outputting three-phase AC voltage signal.

The turbine stator 2 comprises at least two stator openings 35, each with a preset opening angle. The turbine rotor 3 is arranged below the turbine stator 2, wherein a sidewall of the turbine rotor 3 is provided with at least one wide blade 37 and at least one narrow blade 38 by means of several openings spaced apart. Driven by the mud, the power generation module 41 continuously rotates to generate power, and a corresponding mud displacement signal is generated at an outlet of a mud channel of the power generation module 41 through real-time control of mud displacement by a ground system. Therefore, the power generation module 41 according to embodiments of the present invention is driven by continuous rotation of the turbine rotor 3 to generate power, and generates the mud displacement signal corresponding to the downlink pulse signal. At the same time, the power generation module 41 is further used to supply power to the master device 15 and the downhole measurement and control system 45.

Further, the master device 15 is configured to control change in the time when the wide blade 37 or the narrow blade 38 passes through the stator openings 35 by controlling the controllable load 46 of the power generation module 41 based on a first type of information (including various types of measurement data, commands, and other information to be transmitted to the ground) to be uploaded to the ground by the downhole measurement and control system 45, so as to generate the uplink pulse signal with variable time intervals at the stator openings 35. In addition, the master device 15 is also configured to obtain the three-phase AC voltage signal output from the power generation module 41 and decode the voltage signal to obtain downlink information, so that the downhole measurement and control system 45 can obtain, after decoding, a second type of information transmitted from the ground to the downhole (including various types of commands, parameter data and other information to be transmitted to the downhole).

In this manner, the mud pulse generation system according to embodiments of the present invention can not only generate higher-frequency positive-pressure uplink pulse signal with variable time intervals, but also obtain downlink information from the ground, thereby realizing two-way communication as well as supplying power to other downhole systems.

When being installed, the mud pulse generation system comprises a flow cylinder 19. The flow cylinder 19 is installed outside the mud pulse generation system, with a support ring 17 installed on a lower portion thereof, wherein the support ring 17 is axially fit into an inner hole of a suspension sub 1. Specifically, the turbine stator 2 is fixedly connected to the flow cylinder 19, and an axial limiting portion of the turbine stator 2 is in engagement with the support ring 17, forming an external support for the entire system. After assembly, the mud pulse generation system is integrally installed in the inner hole of the suspension sub 1.

The turbine rotor 3 is fixedly connected to the power-generation-module rotor 7 via a transition member 4. The master device 15 is connected to the power-generation-module stator 26 via a plug 13. The turbine stator 2 comprises at least two stator openings 35, and the turbine rotor 3 comprises at least one wide blade 37 and at least one narrow blade 38. At least one radial hole 5 is provided on the transition member 4 in a circumferential direction. A permanent magnet 8 and a magnet sheath 9 are installed within the power-generation-module rotor 7. A radial thrust bearing 31 is installed at a front end of the permanent magnet 8, and a radial bearing 11 is installed at a lower end thereof. A sheath 10 and a core shaft 27 are installed outside and inside the power-generation-module stator 26, respectively. The upper end of the permanent magnet 8 is provided with a sleeve 29 and a locking ring 6, and the lower end thereof is provided with the plug 13. A thrust ring 33 is installed on the locking ring 6. An inner radial thrust bearing 30 is installed on the sleeve 29, an inner radial bearing 12 is installed outside the upper portion of the plug 13, and three sealing pins 32 are installed within the plug 13.

A pressure-resistant cylinder 14 is provided outside the master device 15. An upper part of the pressure-resistant cylinder 14 is connected to the plug 13 through threads, and sealed by a sealing ring 20 to ensure the sealing between the pressure-resistant cylinder 14 and the plug 13. In addition, a friction ring 21 is provided between the plug 13 and the pressure-resistant cylinder 14 to reduce the make-up torque. A lower portion of the pressure-resistant cylinder 14 is provided with an output plug 16 and an outer cylinder 18. The outer cylinder 18 passes through an inner hole of the support ring 17, and is connected to other downhole device (e.g., other downhole measurement and control system 45) that needs to be attached to the mud generation system. A pressure-bearing connector may be provided within the output plug 16 to realize data transmission and power connection with said other downhole device via cables.

The turbine stator 2 is axially installed at the front end of the turbine rotor 3, forming a fluid guiding and receiving section for the flow into the turbine rotor 3. The turbine rotor 3 and the transition member 4 may be fixedly attached to each other, or manufactured in one piece. The transition member 4 is connected to the power-generation-module rotor 7 through threads. The permanent magnet 8 and the magnet sheath 9 are installed within the power-generation-module rotor 7, wherein the permanent magnet 8 may be an array consisting of multiple permanent magnet elements, i.e., a multi-magnetic pole array that rotates synchronously with the turbine rotor 3 to form a variable magnetic field. The magnet sheath 9 must be made of non-magnetic material characterized by high corrosion and wear resistance as well as certain structural strength, in order to realize structural support and protection for the permanent magnet 8. A radial thrust bearing 31 is installed at the front end of the power-generation-module rotor 7, and a radial bearing 11 is installed at the lower end of the power-generation-module rotor 7, wherein both the bearings 31 and 11 are sliding bearings. A plurality of radial holes 5 is arranged along the axial direction on the side wall of the transition member 4 to form a mud channel, for delivering mud to the internal space, lubricating the bearings, and cooling down the power-generation-module stator 26.

The plug 13 is connected to the core shaft 27 through threads, and is provided with two seals 24. The power-generation-module stator 26 is axially installed on the core shaft 27, and a sliding sleeve 29 is installed on an upper portion of the power-generation-module stator 26, wherein the core shaft 27 is fit in an inner hole of the sliding sleeve 29. The locking ring 6 is connected to the core shaft 27 through threads, and presses the sliding sleeve 29 and the power-generation-module stator 26 along the axial direction.

The sheath 10, which is arranged around the power-generation-module stator 26, must be made of non-metallic material to avoid generation of eddy current in the alternating magnetic field. The three-phase output lines of the power-generation-module stator 26 for the three-phase AC voltage signal are connected to the master device 15 via three sealing pins 32 installed on the plug 13 evenly distributed along a circumferential direction thereof.

Further, a sealed internal cavity, formed by the sliding sleeve 29, the power-generation-module stator 26, the sheath 10, the sealing ring 23 and the plug 13, is filled with supporting and sealing material 25 and 28 of the same kind, which is poured and solidified in one single procedure for filling the cavity, so as to realize the sealing, support and protection for the power-generation-module stator 26 in the downhole mud environment.

Further, a thrust ring 33 is installed on the locking ring 6, and an inner radial thrust bearing 30 is installed on the sliding sleeve 29. The inner radial thrust bearing 30 and the radial thrust bearing 31 together form a bearing pair to radially support and axially restrict the upper end of the power-generation-module rotor 7. In addition, an inner radial bearing 12 is installed on the plug 13, with a tolerance ring 22 installed therebetween to ensure the installation precision of the inner radial bearing 12 on the plug 13. The inner radial bearing 12 and the radial bearing 11 form a radial sliding bearing pair, thereby radially supporting the lower end of the power-generation-module rotor 7.

Figure 3:
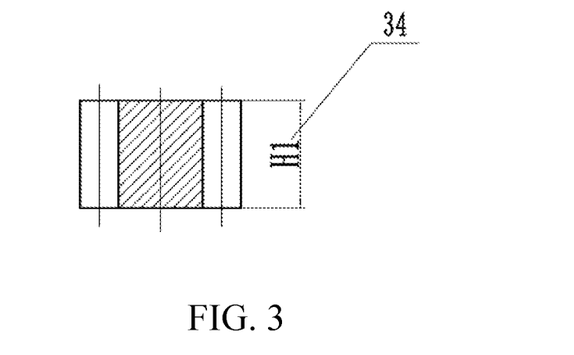
FIG. 3 is a front view of a turbine stator in the mud pulse generation system based on two-way communication according to embodiments of the present application.
Figure 4:
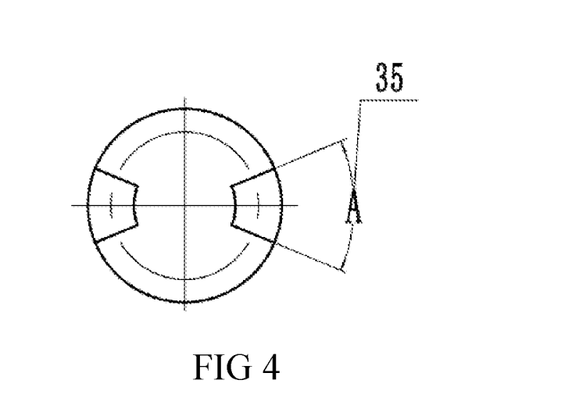
FIG. 4 is a top view of the turbine stator in the mud pulse generation system based on two-way communication according to embodiments of the present application.
Figure 5:
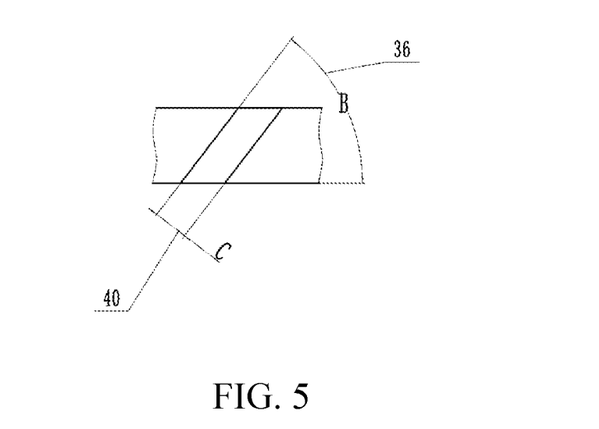
FIG. 5 is an axial sectional view of the turbine stator in the mud pulse generation system based on two-way communication according to embodiments of the present application.

FIG. 3 is a front view of the turbine stator in the mud pulse generation system based on two-way communication according to embodiments of the present application. FIG. 4 is a top view of the turbine stator in the mud pulse generation system based on two-way communication according to embodiments of the present application. FIG. 5 is an axial sectional view of the turbine stator in the mud pulse generation system based on two-way communication according to embodiments of the present application.

As shown in FIG. 4, the turbine stator 2 comprises at least two stator openings 35, each with a preset opening angle. At least two fan-shaped opening grooves are provided on a side wall of the turbine stator 2. In the embodiments of the present invention, the axial height 34 of the stator (see FIG. 3), the (preset) opening angle A of the stator opening 35 (see FIG. 4), and the angle B of the stator helix 36 (see FIG. 5) are all key parameters of the turbine stator 2. Thus, the structure of the turbine stator 2 is configured through the key structural parameters thereof.

In the embodiments of the present invention, the preset opening angle of each stator opening 35 shall be configured to meet the following requirement, i.e., the ratio of the straight angle to the preset opening angle is an integer greater than or equal to 2. That is, the following requirement for the angle of the stator opening is that 180 divided by A should be an integer greater than or equal to 2. Further, the larger the value of A is, the higher the amplitude of the pressure fluctuation pulses (the uplink pulse signal) generated at the turbine stator 2 is. For example, if 180/A=4, the ratio of the pulse duration corresponding to the uplink pulse signal to the non-pulse duration is 1:3.

In the embodiments of the present invention, the axial height 34 and the helix angle 36 of the turbine stator 2 together determine the rotational speed and the output power of the turbine rotor 3. Meanwhile, the axial height (H1) of the turbine stator 2 determines the pressure loss and the efficiency of energy conversion generated after mud flows through the turbine portion, and the helix angle (B) of the turbine stator 2 determines the angle at which the mud flowing from the turbine stator 2 impacts the blades of the turbine rotor 3. The relationship between the axial height and the helix angle of the turbine stator 2 is shown in the following expression:

$$H1 \le \frac{\pi D1 \tan B}{2} \quad (1)$$

wherein H1 denotes the axial height of the turbine stator 2, D1 denotes the maximum outer diameter of the turbine stator 2, and B denotes the helix angle of the turbine stator 2.

Figure 6:
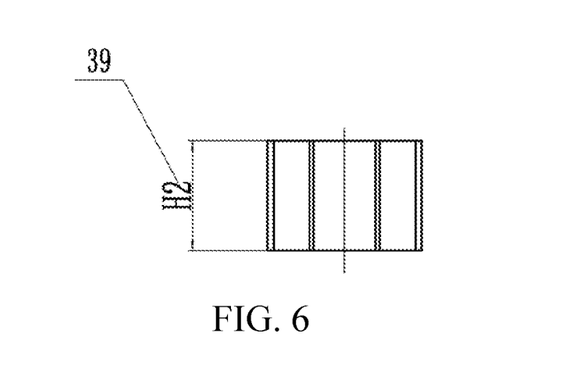
FIG. 6 is a front view of a turbine rotor in the mud pulse generation system based on two-way communication according to embodiments of the present application.
Figure 7:
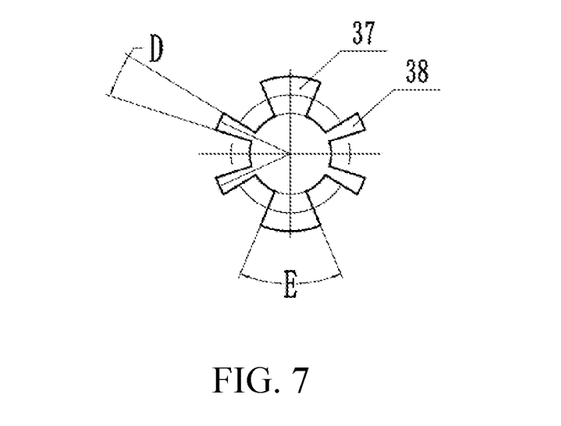
FIG. 7 is a top view of the turbine rotor in the mud pulse generation system based on two-way communication according to embodiments of the present application.

FIG. 6 is a front view of the turbine rotor in the mud pulse generation system based on two-way communication according to embodiments of the present application. FIG. 7 is a top view of the turbine rotor in the mud pulse generation system based on two-way communication according to embodiments of the present application.

In the embodiments of the present invention, the dimension H2 corresponding to the axial height 39 of the turbine rotor 3 (see FIG. 6) shall, in principle, be equal to the axial height H1 of the turbine stator 2.

As shown in FIG. 7, a number of fan-shaped grooves are provided on the side wall of the turbine rotor 3. Each of the fan-shaped grooves is provided to extend through the rotor 3 in the axial direction, so that blades with fan-shaped cross-sections are formed between the fan-shaped grooves, wherein the blades comprise at least one wide blade 37 and at least one narrow blade 38. In the embodiments of the present invention, the angle E corresponding to each wide blade 37 shall be equal to the preset opening angle A, or the angle E corresponding to each wide blade 37 shall be less than and close to the preset opening angle A (i.e., slightly less than the preset opening angle A). The angle D2 corresponding to each narrow blade 38 is calculated according to the following expression:

$$D2 \le \frac{180 - E}{\frac{n}{2} + 1} \quad (2)$$

wherein D2 denotes the angle corresponding to the narrow blade 38, E denotes the angle corresponding to the wide blade 37, and n denotes the total number of the narrow blades 38 of the turbine rotor 3 when at least one narrow blade 38 is provided within a semicircular area in the cross-section of turbine rotor 3.

It should be noted that the number of the narrow blades 38 is not limited in the embodiments of the present invention, but the angles thereof should also meet the condition in above expression (2). In addition, both the narrow blade 38 and the wide blade 37 with fan-shaped structures are arranged in the axial direction. For example, as shown in FIG. 7, if two wide blades 37 are provided opposite each other in the turbine rotor 3, the angle E is equal to or slightly smaller than the opening angle A of the turbine stator, and if four narrow blades 38 are provided, the angle D≤(180−E)/3.

Further, in the embodiments of the present invention, the change in amplitude of the three-phase AC voltage signal generated by the power generation module 41 when supplying power is formed by the ground system through the real-time control of the change in mud displacement. In the actual application, the real-time value of the mud displacement is adjusted by the ground system according to the downlink information. Under the impact of the drilling mud, the turbine rotor 3 rotates at a speed proportionate to the real-time value of the mud displacement, and the drilling mud enters into the pulser via the turbine stator 2 and the turbine rotor 3. By regularly changing the flow area between the turbine stator 2 and the turbine rotor 3, the mud pressure pulse signal that varies regularly can be generated at the rear end of the turbine rotor 3 (i.e., the end surface close to the downhole), in order to drive the power generation module to generate power, thereby generating a three-phase AC voltage signal that matches the real-time value of the mud displacement. Alternatively, the mud pressure pulse signal (i.e., an uplink mud pulse signal) that varies regularly may also be generated at the front end of the turbine stator 2 (i.e., the end surface close to the ground).

Further, in the embodiments of the present invention, the power generation module 41 is configured as a low-rotational speed generator with multiple pole pairs, wherein the number of pole pairs of the power generation module 41 is twice the ratio of the round angle to the preset opening angle. That is, the number of pole pairs required for the power generation module 41 shall meet the condition in the following expression:

$$P = 360°/A \quad (3)$$

wherein P denotes the number of pole pairs of the power generation module 41. It should be noted that the number of pole pairs required in the power generation module 41 is not limited in the embodiments of the present invention, which can be determined by one skilled in the art according to actual needs. For example, if said preset opening angle is 45°, the number of pole pairs P=360°/A=8. At this time, eight sinusoidal power waveforms are output from each phase of the power-generation-module stator 26 as the turbine rotor 3 revolves in a circle relative to the turbine stator 2.

Figure 8:
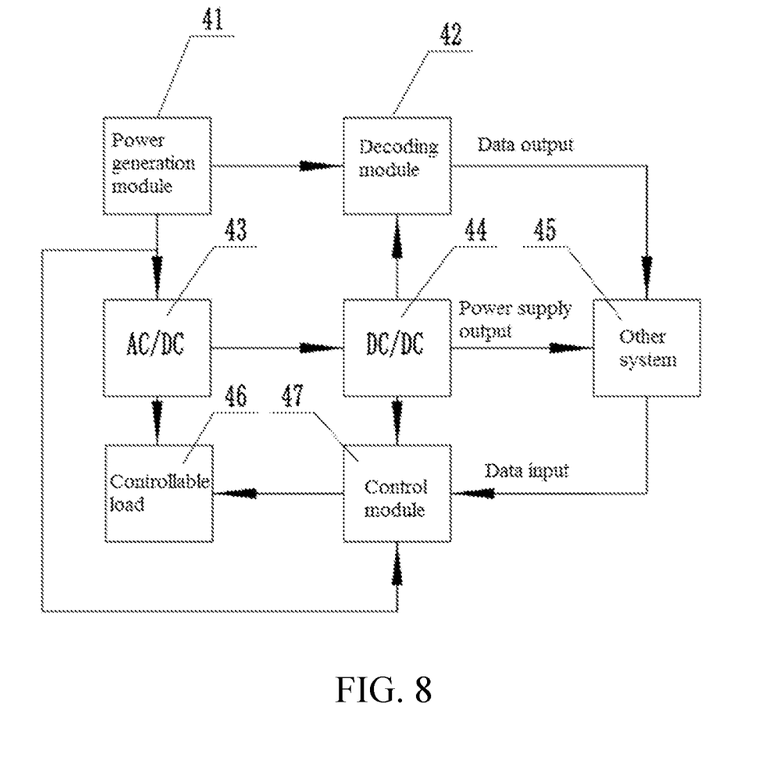
FIG. 8 schematically shows a structure of a master device in the mud pulse generation system based on two-way communication according to embodiments of the present application.

FIG. 8 schematically shows a structure of a master device in the mud pulse generation system based on two-way communication according to embodiments of the present application. As shown in FIG. 8, the master device 15 according to the embodiments of the present invention at least comprises a pulse control module 47, a decoding module 42, a rectifying module 43, and a DC voltage conversion module 44.

The rectifying module 43 is connected to the three-phase AC power output end of the power generation module 41, and the input end of the DC voltage conversion module 44 is connected to the AC output end of the rectifying module 43, which is also connected to the power input end of the controllable load 46 of the power generation module 41. In addition, the output end of the DC voltage conversion module 44 is connected to the power input ends of the decoding module 42, the pulse control module 47, and other downhole measurement and control system 45, respectively.

Specifically, the rectifying module 43 is configured to obtain and rectify the three-phase AC voltage (power signal) output from the power generation module 41, so as to supply power to the controllable load 46 of the power generation module 41. The DC voltage conversion module 44 is configured to convert the rectified output voltage signal output from the rectifying module 43 into a DC voltage, in order to generate power signals of different DC voltage levels, thereby supplying power to the downhole measurement and control system 45, as well as the decoding module 42 and the pulse control module 47 within the master device 15.

The decoding module 42 is also connected to the AC-voltage amplitude detection port of the three-phase AC output power supply in the power generation module 41. The decoding module 42 is configured to monitor the change in amplitude of said three-phase AC voltage signal. When downlink information in the signal is detected, the current three-phase AC voltage signal is automatically decoded and the downlink information to be transmitted from the ground to the downhole is generated, so that the downlink information can be transmitted to the downhole measurement and control system 45, in order to control the downhole measurement and control system and set parameters therefor. Specifically, the decoding module 42 monitors in real time the change in amplitude of the three-phase AC power supply signal output by the power generation module 41, determines whether there is a downlink transmission of the downlink information, automatically decodes the three-phase AC power supply signal to obtain the decoded downlink information when there is downlink transmission of the downlink information, and sends the decoded downlink information to said other system 45.

In this manner, the rotational speed of the turbine rotor 3 changes due to the change in the mud displacement, thereby changing the amplitude of the three-phase output voltage generated by the power generation module 41. Further, the displacement changes when the ground system controls the displacement according to a preset downlink pulse rule. Therefore, it is possible to detect the change in the output voltage of the generator by means of the decoding circuit, so that the downlink information can be decoded according to the downlink pulse rule. As a result, when the mud is pumped downward from the ground according to a set displacement rule, the power generation module driven by the turbine will generate fluctuating voltage corresponding to the displacement rule, and the downlink transmission data will be decoded after filtering.

The pulse control module 47 is connected to the three-phase AC power supply output of the power generation module 41, the downhole measurement and control system 45, and the controllable load 46, respectively. The pulse control module 47 is configured to select, based on the results of monitoring the state of output voltage of the power generation module 41, different time-interval coding strategies according to the current uplink information to be transmitted to the ground, so that the uplink pulse signal matching the current time-interval coding strategy can be generated at the turbine stator 2.

Unlike the sinusoidal-like waveforms generated by the common shear-valve continuous-wave pulsers or continuous rotary pulsers, the uplink pressure fluctuating pulses generated by the mud pulse generation system according to the embodiments of the present invention are pulse signals of variable time intervals, which are similar to the pressure waveforms generated by the conventional low-rate switching-valve pulsers. However, the frequency of pressure fluctuating pulses, and the total number of the time-interval coding strategies are determined by the specific structures of said turbine stator 2 and said turbine rotor 3, as well as the properties of the power generation module 41. Accordingly, a pulse rate much higher than that of conventional switching-valve pulsers can be generated, which can even be close to or exceed that of the continuous-wave pulsers.

Figure 9:
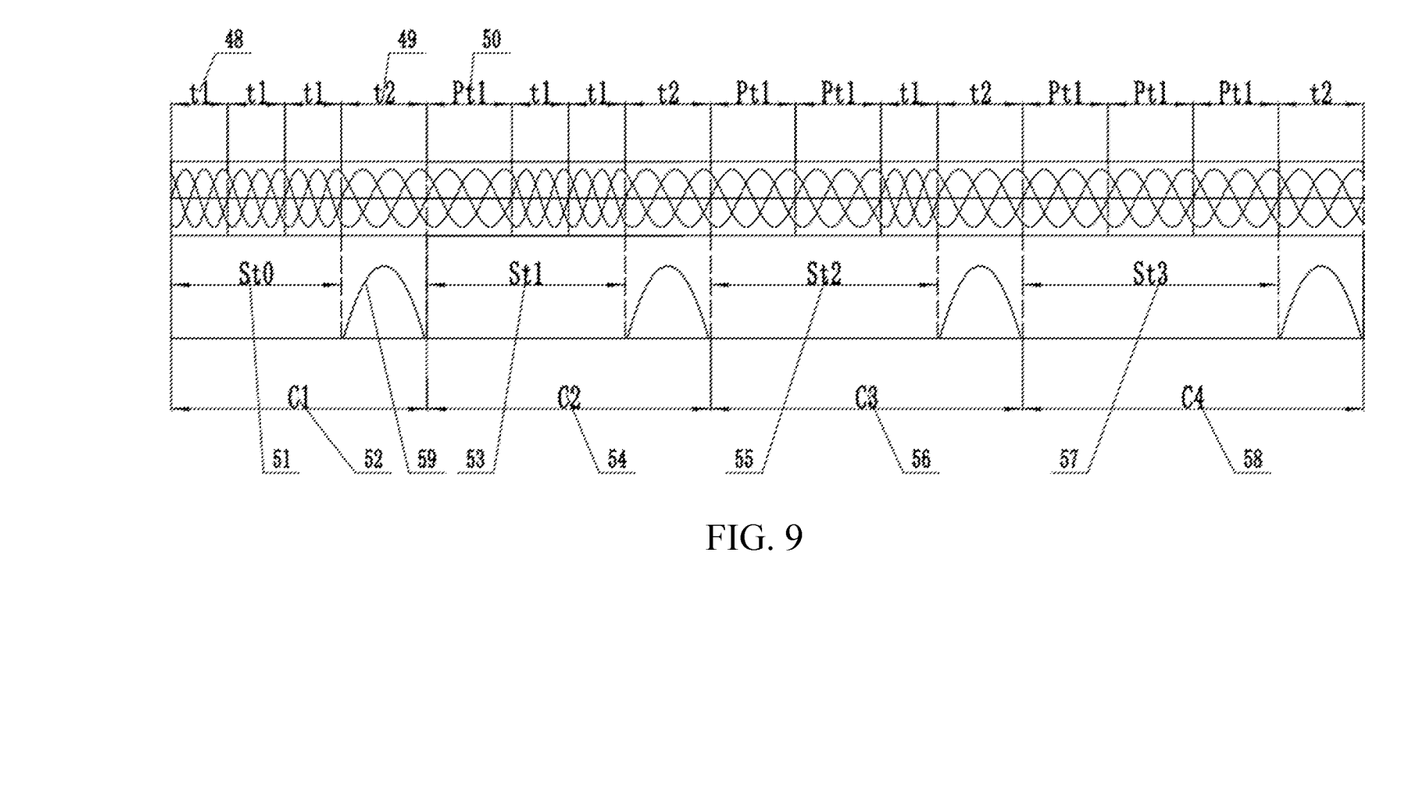
FIG. 9 schematically shows the coding principle of a pulse control module in the mud pulse generation system based on two-way communication according to embodiments of the present application.

In the embodiments of the present invention, there are four types of time-interval coding strategies based on the specific structures of said turbine stator 2 and said turbine rotor 3, as well as the properties of the power generation module 41. FIG. 9 schematically shows an encoding principle of the pulse control module in the mud pulse generation system based on two-way communication according to embodiments of the present application. It should be noted that the waveforms shown in FIG. 9 of the present invention do not demonstrate fluctuation changes in the voltage amplitude, and are only exemplary of the timing of signal changes in the controlling modes.

Further, the pulse control module 47 will monitor, in real time, the (frequency) features of waveform changes of the three-phase AC voltage signal output by the power generation module 41. There are four types of three-phase AC voltage waveforms output by the power generation module 41 in total, i.e., C1 state 52, C2 state 54, C3 state 56, and C4 state 58.

The first-state pulse waveform C1 consists of a plurality of first waveforms each with a full wave period of T1 and a second waveform with a full wave period of T2, wherein the first waveforms are generated by the mud flow channel with a specific area formed when the narrow blade 38 passes through the stator openings 35, and the second waveform and the effective pulse in the uplink pulse signal are both generated by the mud flow channel with a specific area formed when the wide blade 37 passes through the stator openings 35. The pulse control module 47 is configured to monitor the continuous change in the waveform of each phase in the three-phase AC voltage signal output in real time by the power generation module 41, and to switch off the controllable load 46 when the three-phase AC voltage signal is detected to be in the first state (that is, a first mode of switching on or off the controllable load). Since the pulse control module 47 will, in the C1 state 58, keep the controllable load 46 disconnected, at this time the three-phase AC voltage signal output by the power generation module 41 periodically changes based on the C1 state. In this manner, the pulse control module 47, when the current voltage output signal is detected to be in the first state, switches off the controllable load 46, so that the power generation module 41 will continuously output the three-phase AC voltage signal based on the first state. Furthermore, the current uplink pulse signal formed at the turbine stator 2 is a first-state mud signal that transmits valid pulses after a first-state coding time lapses, wherein the first-state coding time corresponds to a combination of a plurality of first waveforms each with a full wave period of T1.

Specifically, when the narrow blade 38 and the openings adjacent thereto pass through the stator openings 35, the three-phase AC voltage outputs a t1 wave 48 (i.e., the first waveform with a full wave period of T1). When the wide blade passes through the stator openings 35, a mud pulse 59 is formed at the stator openings 35, and the three-phase AC voltage outputs a t2 wave 49 (i.e., the second waveform with a full wave period of T2). In the C1 state 52, the coding time 51 consists of three t1 waves 48 and one t2 wave 49, i.e., said first-state coding time being St0. At this time, the pulse control module 47 keeps the controllable load 46 disconnected when detecting that the three-phase output power supply is in the C1 state 58.

Further, the C2 state 54, the C3 state 56 and the C4 state 58 are different states altered from the first state C1, i.e., different types of first-state altered states. In the embodiments of the present invention, the waveforms of the first-state altered states are formed when the pulse control module 47 replaces at least one first waveform in the first-state waveform with another waveform by switching on the controllable load 46. That is, since in the first state C1 there is a number of first waveforms, the pulse control module 47 briefly switches on the controllable load 46 at the time when the first waveform in the first-state waveform appears, so that the rotational speed of the power-generation-module rotor 7 is reduced by changing the operating load state of the power generation module 41 while the controllable load 46 is switched on, thereby reducing the frequency of the three-phase AC voltage. At this time, the first waveform in the first-state waveform is replaced with a third waveform with a full wave period of PT1 based on the timing of switching on the controllable load 46, wherein the duration of switching on the controllable load 46 corresponds to that of a complete sinusoidal waveform (which can be obtained from the results of monitoring the changing state of the three-phase output power supply by the pulse control module 47). Moreover, the current uplink pulse signal formed at the turbine stator 2 is a mud signal that transmits valid pulses after a specific coding time lapses, wherein the specific coding time corresponds to a combination of at least one first waveform and/or at least one third waveform.

It should be noted that in the embodiments of the present invention, any one of the first waveforms in the first-state waveform can be replaced with the third waveform, or at least two first waveforms in different positions (which can be consecutive or spaced apart) in the first-state waveform can be replaced with the third waveform, whereby, based on different combinations of specific position and number of replaced first waveforms, different types of the first-state altered states and corresponding specific waveform-changing (frequency) states of the three-phase AC voltage can be formed.

The waveform of the second state C2 is obtained by replacing the first waveform in the first-state waveform with the third waveform. The pulse control module 47 is configured to monitor the continuous change of the waveform of each phase in the three-phase AC voltage signal output from the power generation module 41 in real time. When the signal of the three-phase AC voltage is detected to be in the second state, the controllable load 46 is switched on at the start of the second state, and switched off after one full sinusoidal cycle (i.e., the second mode of switching on or off the controllable load). When the pulse control module 47 keeps the controllable load 46 connected in the C2 state 54 for one sinusoidal cycle, the three-phase AC voltage signal output by the power generation module 41 changes periodically based on the C2 state, so that when the pulse control module 47 detects that the current voltage output signal is in the second state, the power generation module 41 constantly outputs an three-phase AC voltage signal based on the second state by switching on or off the controllable load 46. Further, the current uplink pulse signal formed at the turbine stator 2 is a second-state mud signal that transmits valid pulses after a second-state coding time lapses, wherein the second-state coding time corresponds to a combination of two first waveforms and one third waveform.

Specifically, in the C2 state 54 the coding time 53 consists of one Pt1 wave 50 and two t1 waves 48, i.e., the second-state coding time is denoted by St1. At the start of the C2 state 54, the pulse control module 47 monitors the three-phase sinusoidal waveform output by the power generation module 41, instantaneously switches on the controllable load 46 when the waveform is at the start of the full cycle, and instantaneously switches it off after one sinusoidal cycle, thus forming the Pt1 wave 50. In this manner, the waveforms of the three-phase AC voltage signal output by the power generation module 41 change in the second state C2.

The waveform of the third state C3 is obtained by replacing two first waveforms in the first-state waveform with the third waveforms. The pulse control module 47 is configured to monitor the continuous change in the waveforms of each phase in the three-phase AC voltage signal output by the power generation module 41 in real time. When the three-phase AC voltage signal is detected to be in the third state, the controllable load 46 is switched on at the start of the third state, and switched off after one sinusoidal cycle. Then, the controllable load 46 is switched on immediately, and switched off after one sinusoidal cycle. Alternately, the controllable load 46 is switched on immediately after one first waveform appears, and switched off after one sinusoidal cycle (i.e., the third mode of switching on or off the controllable load). Since the pulse control module 47 switches on and off the controllable load 46 twice continuously or at intervals in the C3 state 54, the three-phase AC voltage signal output from the power generation module 41 periodically varies based on the C3 state. In this manner, the pulse control module 47, when detecting that the current voltage output signal is in the third state, switches on or off the controllable load 46, so that the power generation module 41 continuously outputs the three-phase AC voltage signal based on the third state. Further, the current uplink pulse signal formed at the turbine stator 2 is the third state mud signal that transmits valid pulses after a third-state coding time lapses, wherein the third-state coding time corresponds to a combination of two third waveforms and one first waveform.

Specifically, the C3 state 56 has one more Pt1 waveform compared with the C2 state. The second Pt1 waveform and the first Pt1 waveform may be continuous, or spaced apart by one t1 waveform, thus forming the coding time 55. That is, the third-state coding time is denoted by St2.

The waveform of the fourth state C4 is obtained by replacing three first waveforms in the first-state waveform with the third waveforms. The pulse control module 47 is configured to monitor the continuous change in the waveforms of each phase in the three-phase AC voltage signal output by the power generation module 41 in real time. When the three-phase AC voltage signal is detected to be in the fourth state, the controllable load 46 is switched on at the start of the fourth state, and switched off after one sinusoidal cycle. Then, the controllable load 46 is immediately switched on (for the second time) and switched off after one sinusoidal cycle. Finally, the controllable load 46 is switched on (for the third time) and switched off after one sinusoidal cycle (i.e., the fourth mode of switching on or off the controllable load). Since the pulse control module 47 switches on and off the controllable load 46 three times consecutively at the C4 state 58, the three-phase AC voltage signal output from the power generation module 41 varies periodically based on the C4 state. In this manner, the pulse control module 47, when detecting that the current voltage output signal is in the fourth state, switches on or off the controllable load 46, so that the power generation module 41 continuously outputs the three-phase AC voltage signal based on the fourth state. Further, the current uplink pulse signal formed at the turbine stator 2 is the fourth state mud signal that transmits valid pulses after a fourth-state coding time lapses, wherein the fourth-state coding time corresponds to a combination of three third waveforms.

Specifically, the C4 state 58 has one more Pt1 waveform compared with the C3 state, forming the coding time 57. That is, the fourth-state coding time is denoted by St3. As a result, St0, St1, St2, and St3 enable the pulses 59 to appear at regular intervals in terms of timing. The pulses 59 are the pressure pulse fluctuations, which are transmitted to the ground through the mud channel. The ground pressure sensor can receive and then decode the signal, thereby uploading the data.

Further, in order to realize the combination of the uplink information (e.g., actually-measured data, command, feedback data and other information obtained from the downhole measurement and control system to be uploaded to the ground system) with the uplink pulse signal with variable time intervals, the pulse control module 47 according to the embodiments of the present invention is also configured to identify the uplink information obtained from the downhole measurement and control system, and determine, according to the uplink information by means of a preset mapping network between data of the uplink information and time-interval coding strategy combinations, a corresponding time-interval coding strategy combination. Then, a corresponding uplink pulse signal (with variable time intervals) is generated at the stator openings of the turbine stator 2 according to the mode of switching on and off the controllable load corresponding to each state element indicated in the current time-interval coding strategy combination, so that after identifying the time intervals of adjacent valid pulses in the mud signal received in real time, the ground system can decode the signal according to a strategy matching said mapping network, thereby obtaining the current uplink information and further realizing the transmission of the uplink information to the ground.

Said time-interval coding strategy combination comprises different types of state elements arranged in a specified state sequence generated based on the uplink information. Said state elements include the first state and different types of first-state altered states. That is, the state elements include the first state, the second state, the third state, and the fourth state. In the embodiments of the present invention, the first-state altered state is a state of the three-phase AC voltage signal generated when the pulse control module 47 replaces at least one first waveform in the first-state waveform with another waveform through switching on the controllable load. In other words, the first-state altered state is a state (i.e., the second state or third state or fourth state) presented by the waveforms of a corresponding three-phase AC voltage signal output by the power generation module 41, which is achieved through switching on and off the controllable load by the pulse control module 47 so that the power generation module 41 outputs different three-phase AC voltage signals based on said second state or third state or fourth state. Thus in the embodiments of the present invention, the period t2, i.e., the timing when the wide blade passes through the stator openings, changes as the time period t1 during which the corresponding narrow blade passes through the stator blade changes, so that valid pulses with variable time intervals can be formed at the stator openings.

Further, said specified state sequence refers to the actual sequence of the first state, the second state, the third state and the fourth state, which is determined by the uploaded information. For example, when uploading the uplink information with the binary data of "0011" to the ground, a specific time-interval coding strategy combination corresponding to the data "0011" (e.g., a combination of voltage signals that controls the power generation module to output the first state C1 and the second state C2, in which case the sequence of state elements is the first state and the second state in order) can be determined according to said preset mapping network. Subsequently, the pulse control module 47, according to the mode of switching on and off the controllable load corresponding to each state element in the state element sequence indicated in the current specific time-interval coding strategy combination, generates the first-state mud signal and the second-state mud signal at the stator openings 35 in sequence, so that after identifying the time intervals of adjacent valid pulses in the mud signal received in real time, the ground system can decode the signal according to the strategy matching said mapping network, thereby obtaining the current uplink information.

Therefore, in the embodiments of the present invention the dedicated pulse generation and control mechanism in common mud pulsers for measurement-while-drilling can be omitted. The power generation module is driven by turbine stator and turbine rotor with specific structures, and the controllable load of the power generation module is controlled by the master device. Further, the timing of the relative position between the turbine stator and the turbine rotor can be controlled, so as to control and code the pressure fluctuation pulses, thereby forming the pressure pulse fluctuation and realizing the uploading of data.

Further, the mud pulse generation system according to the embodiments of the present invention generates two, or integer multiples of two, pressure fluctuation pulses during each rotation, and for example, a minimum of twenty pressure fluctuation pulses per second can be generated at a rotor speed of ten rotations per second, as the turbine rotor rotates continuously to drive the power generation module to supply power.

The present invention proposes a mud pulse generation system based on two-way communication. The system adopts a low-rotation speed power generator module having multiple pole pairs, and is driven to generate power by a turbine stator with specific fan-shaped openings and a turbine rotor with straight blades of two cross-sectional shapes distributed evenly from each other. The generator-output signals are rectified by a control circuit, in order to supply power to external systems. In the meantime, the generator load is dynamically adjusted by switching on and off a controllable load. According to the mapping network between the uplink information and the specific coding time rule, a specific rule of change in generator load is formed, so that during one rotation of the turbine rotor, the rotor blades with two types of cross-sectional shapes pass through the turbine stator openings, generating mud signal of pressure pulses with variable intervals between valid pulses. Due to the generator load, the timing when valid pressure pulse appears corresponds to the specific coding rule, and finally the pressure pulse sequence that can be received and decoded on the ground can be formed. In addition, the rotation speed of the turbine rotor changes due to the displacement change under the control of the ground system, which results in change in generator voltage output. Specific displacement changes are generated as the ground device controls the displacement according to the preset rule. The control circuit detects the change in generator voltage, and decodes the data according to the set rule. The frequency of the pressure fluctuation pulse generated in the present invention is determined by the stator, the rotor, and the properties of power generation module in the present invention. Therefore, a pulse rate much higher than that of a conventional switching-valve pulser can be generated, which can be even close to or exceed that of a continuous-wave pulser. Moreover, the mud pulse generation system according to the present invention, while generating mud pulses, requires no external power supply, and can supply power to external systems.

Further, the turbine rotor according to the present invention can rotate freely in an uncontrolled state and drive the power generation module to supply power. In a controlled state, the master device is configured to control the controllable load at the output end of the power generation module to change the timing when each blade of the rotor passes through the stator openings, so as to generate a corresponding pulse signal with variable time intervals.

The foregoing is merely illustrative of preferred embodiments of the present invention, but the scope of protection of the present invention is not limited thereto. Any modifications or substitutions that can be readily conceived by one skilled in the art within the technical scope disclosed herein shall fall within the scope of protection of the present invention. Therefore, the scope of protection of the present invention should be determined according to the scope of protection of the claims.

It should be understood that the embodiments of the present invention are not limited to the specific structures, processing steps or materials disclosed herein, but should extend to equivalent substitutions of these features understood by one ordinarily skilled in the art. It should also be understood that the terminology used herein is for the purpose of describing a particular embodiment only, rather than being construed as restriction.

The phrase "an embodiment" or "embodiments" as mentioned in the description means that the particular features, structures or characteristics described in conjunction with the embodiment or embodiments are included in at least one embodiment of the present invention. Thus, the phrase "an embodiment" or "embodiments" used throughout the description does not necessarily refer to the same embodiment.

Although the embodiments of the present invention are described hereinabove, the disclosure is provided for facilitating to understand the implementing mode of the present invention, but rather restricting the present invention. Without departing from the spirit and scope of the present disclosure, one skilled in the art can make various modifications and improvements in forms and details of the implementing mode. The scope of protection of the present invention shall be determined by the appending claims.

The invention claimed is:

1. A mud pulse generation system based on two-way communication, comprising:
   a turbine stator, comprising at least two stator openings each with a preset opening angle;
   a turbine rotor, having a sidewall provided with at least one wide blade and at least one narrow blade spaced from each other through several openings;
   a power generation module, which is driven by rotation of the turbine rotor for supplying power; and
   a master device, which is configured to control relative time when the wide blade or the narrow blade passes through the stator openings by controlling a controllable load of the power generation module based on uplink information, generate an uplink pulse signal with variable time intervals at the stator openings, and monitor and decode three-phase AC voltage signal output by the power generation module to obtain downlink information.

2. The mud pulse generation system according to claim 1, characterized in that the preset opening angle is configured to meet a stator opening condition, wherein a ratio of straight angle to the preset opening angle is an integer greater than or equal to 2.

3. The mud pulse generation system according to claim 1, characterized in that an axial height of the turbine stator is determined according to the following expression:

$$H1 \leq \frac{\pi D1 \tan B}{2},$$

wherein H1 denotes the axial height of the turbine stator, D1 denotes a maximum outer diameter of the turbine stator, and B denotes a helix angle of the turbine stator; and
   an axial height of the turbine rotor is equal to that of the turbine stator.

4. The mud pulse generation system according to claim 1, characterized in that an angle corresponding to the wide blade is equal to the preset opening angle, or the angle corresponding to the wide blade is less than and close to the preset opening angle.

5. The mud pulse generation system according to claim 4, characterized in that an angle corresponding to the narrow blade is determined according to the following expression:

$$D2 \leq \frac{180 - E}{\frac{n}{2} + 1},$$

wherein D2 denotes the angle corresponding to the narrow blade, E denotes the angle corresponding to the wide blade, and n denotes a total number of the narrow blades of the turbine rotor when at least one narrow blade is provided within a semicircular area in a cross-section of the turbine rotor.

6. The mud pulse generation system according to claim 1, characterized in that the power generation module is configured as a low-rotation speed generator with multiple pole pairs, wherein a number of pole pairs of the power generation module is twice a ratio of a round angle to the preset opening angle.

7. The mud pulse generation system according to claim 1, characterized in that the master device comprises:
   a pulse control module configured to select different time-interval coding strategies according to results of monitoring output voltages of the power generation module and current uplink information to be transmitted to the ground, in order to generate said uplink pulse signal.

8. The mud pulse generation system according to claim 7, characterized in that,
   the pulse control module is configured to monitor continuous change in a waveform of each phase in the three-phase AC voltage signal output by the power generation module, and switch off the controllable load when the signal is detected to be in a first state,
   wherein a first-state waveform consists of a plurality of first waveforms with a full period of t1 and a second waveform with a full period of t2, the first waveform being generated when the narrow blade passes through the stator openings, and the second waveform and pulses in the uplink pulse signal being generated when the wide blade passes through the stator openings.

9. The mud pulse generation system according to claim 8, characterized in that,
the pulse control module is further configured to identify the uplink information obtained from a downhole measurement and control system, determine a time-interval coding strategy combination according to the uplink information, and generate the uplink pulse signal with variable time intervals at the turbine stator according to a mode of switching on and off the controllable load corresponding to each state element indicated in the time-interval coding strategy combination, thereby realizing transmission of the uplink information to the ground,
wherein said time-interval coding strategy combination comprises different types of state elements arranged in a specified state sequence generated based on the uplink information, said state elements including a first state and different types of first-state altered states, each of the first-state altered states being a state of the three-phase AC voltage signal generated when the pulse control module replaces at least one first waveform in the first-state waveform with another waveform through switching on the controllable load.

10. The mud pulse generation system according to claim 7, characterized in that the master device further comprises:
a decoding module configured to monitor change in voltage amplitude of said three-phase AC voltage signal, decode, when the voltage signal is detected as containing downlink information, a current three-phase AC voltage signal to extract the downlink information, so that the downlink information is transmitted to a downhole measurement and control system.

11. The mud pulse generation system according to claim 7, characterized in that the master device further comprises:
a rectifying module, connected to a three-phase AC output end of the power generation module, and configured to obtain and rectify the three-phase AC voltage signal output by the power generation module, in order to supply power to the controllable load of the power generation module; and
a DC voltage conversion module, connected to an output end of the rectifying module, and configured to convert rectified output voltage signal into DC voltage, in order to generate power signals of different DC voltage levels, thereby supplying power to the downhole measurement and control system, as well as the decoding module and the pulse control module within the master device.

12. The mud pulse generation system according to claim 1, characterized in that the change in amplitude of the three-phase AC voltage signal is realized by controlling change in mud displacement.

* * * * *